Dec. 27, 1949  D. H. LEVINTHAL  2,492,489
SURGICAL RETRACTOR
Filed July 9, 1948

Daniel H. Levinthal INVENTOR.
BY W. G. Burns
Attorney.

Patented Dec. 27, 1949

2,492,489

UNITED STATES PATENT OFFICE 2,492,489

SURGICAL RETRACTOR

Daniel H. Levinthal, Beverly Hills, Calif., assignor to Harry Herschel Leiter, Warsaw, Ind.

Application July 9, 1948, Serial No. 37,870

2 Claims. (Cl. 128—20)

This invention relates to improvements in a surgical retractor for use where amputation of a limb is required.

An object of the invention is to afford an appliance for moving the flesh, that encompasses a bone, back away from the place where severance of the bone is required, thus to fully expose the bone and afford access for applying a severing instrument thereto.

Another object of the invention is to construct a retractor having two separable plate members, portion of which overlap each other and have corresponding opposite notches arranged so as to provide a restricted opening for reception of a bone when the plates are in closed position.

A further object of the invention is to provide means for automatically securing the separable plates together when moved into operating position around a bone to be severed.

And a still further object of the invention is to construct the plate members and their securing means so the members may be quickly separated and re-assembled thus to facilitate sterilization and subsequent cleansing of the parts to promote sanitation.

Other objects and advantages of the invention appear in the following description.

An illustrative embodiment of the invention is shown in the accompanying drawings, in which—

Figure 1:
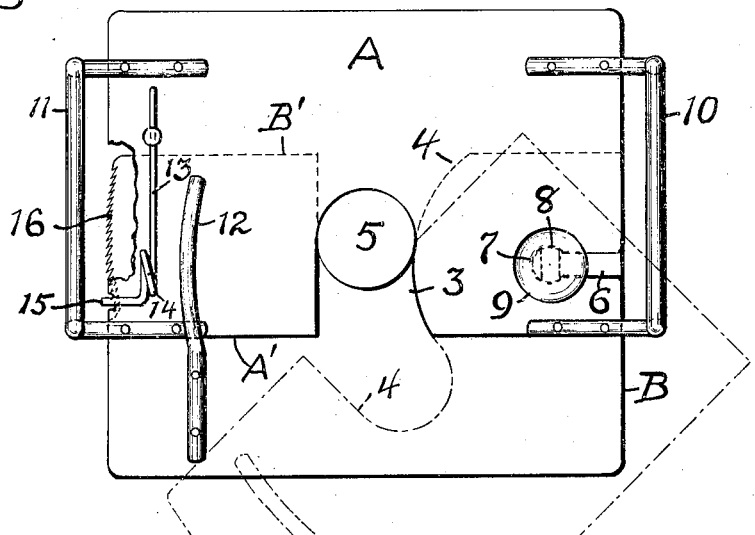
Figure 2:
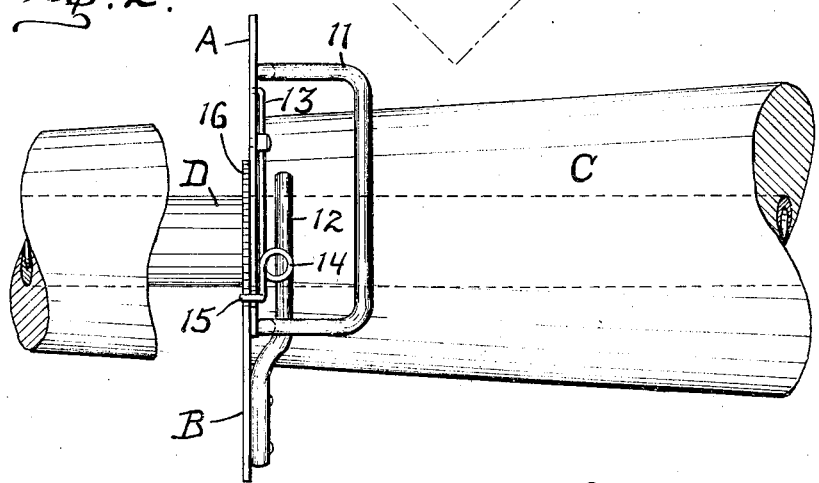

Fig. 1 is a front elevational view of a structure in which the invention is incorporated, a portion being broken away; and Fig. 2 is a side elevational view of the structure shown in Fig. 1, and including a fragmentary view of a limb where amputation is required.

The invention consists of two flat plate members A and B respectively. The lower marginal portion A' of the plate A overlaps the upper marginal portion B' of the plate B, and has a notch 3 located approximately midway between its ends, and extends upwardly from its lower edge.

The upper marginal portion B' of the plate B has a downwardly extending notch 4 located oppositely with respect to the notch 3 in the plate A, so that when the plate members are in closed position a round aperture 5 is left extending through the overlapping portions of the plate members for accommodation of the bone to be severed.

The plate A has a horizontal open slot 6 in one end of its overlapping portion, the inner end of the slot having a rounded enlargement 7 for accommodation of the shank 8 of a bolt 9 that is secured to the plate B with its head overhanging the slot 6 and the opening 7. The sides of the shank are flattened, so that when the plate B is swung pivotally outward from its operating to another selected position, the flat sides of the shank are then alined with the slot 6, permitting disconnection or reassemblage of the plate members accordingly as said members are manipulated.

The plate A has secured on each end thereof a handle 10—11, and the plate B has secured on its lower portion a guide 12, the upper end portion of which overhangs the lower portion of the plate A and, preferably, rides on the adjacent inner end of the handle 11, the purpose of the guide being to hold the plate members closely in contact with each other when in operating position.

The plate A has secured thereon a spring lever 13 provided with a thumb-piece 14 for manipulating it, the free end of the lever being bent to form a ratchet 15 that has engagement with an arcuate series of downwardly inclined teeth 16 made in the adjacent end of the plate member B, the arrangement being such that as the plate members are moved into operating position the ratchet engages the teeth and thus prevents retraction of said members until the lever is moved outwardly by applying pressure against the thumb-piece which causes disengagement of the ratchet with said teeth.

In utilizing the invention, after an incision has been made in the flesh of a limb, indicated generally by C, the plate members, after having been sterilized, are first coupled together, spread apart and inserted in the incision astride the bone D, so the bone is encompassed and confined within the aperture 5, after which an operative, by grasping the handles 10—11 exerts force to move the flesh surrounding the bone toward the proximal end of the limb away from the opposing wall of the flesh on the distal part of the limb to be amputated. This operation affords a gap between the opposing walls of flesh where the incision is made, and leaves an ample exposure of the bone, by which is facilitated severance and subsequent dressing thereof.

A valuable feature of the invention is that the arrangement and character of the severable parts, the manner of applying the retractor and subsequent removal thereof from the injured limb, permits rapidity of operation which is highly essential in major surgical operations.

Variations from the particular construction above disclosed may be resorted to by the exercise of skill in the art, without departure from the invention.

What I claim is:

1. An instrument for use in surgical amputation consisting of two overlapping plate members, one of which has an open notch in its overlapping portion located approximately midway between its ends, the other plate member having a similar open notch in its upper overlapped portion, said notches being alined and affording, when said members are in operating position, an aperture for a bone to be severed, one of said members having an open slot in one end thereof that has a rounded enlargement in its inner end, a bolt secured to the other plate member, the head of which overlies said slot, and the shank of which has flattened sides that are alined with said slot when the plate members are moved relatively into a selected position, whereby to permit separation or assemblage of said members accordingly as positioned, one of said plates having thereon operating handles secured to the ends thereof, and a spring lever secured on one of said plate members provided with a ratchet engageable with an arcuate series of teeth on the corresponding marginal edge of the other plate member.

2. A surgical instrument consisting of two overlapping plate members, one of which has an open notch in its overlapping midportion, the other plate member having a mating open notch in its upper overlapped midportion, said notches being alined and affording, when said members are in operating position, an aperture for reception of a bone to be severed, one of said members having a slot in one end thereof, and the other member having a bolt the shank of which is flattened and extends through said slot to permit coupling and disconnection of said members when moved into selected positions, a guide secured on one of said members overlapping the other member whereby to retain contact between said members, and a ratchet in connection with one of said members engageable with teeth on the other member whereby to secure said members relatively, in adjusted positions.

DANIEL H. LEVINTHAL.

REFERENCES CITED

The following references are of record in the file of this patent:

UNITED STATES PATENTS

| Number | Name | Date |
|---|---|---|
| 1,550,403 | Turkus | Aug. 18, 1925 |